(12) United States Patent
Ngo et al.

(10) Patent No.: US 11,119,958 B2
(45) Date of Patent: Sep. 14, 2021

(54) HYBRID BUS APPARATUS

(71) Applicant: Qorvo US, Inc., Greensboro, NC (US)

(72) Inventors: Christopher Truong Ngo, Queen Creek, AZ (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/599,384

(22) Filed: Oct. 11, 2019

(65) Prior Publication Data

US 2020/0334185 A1 Oct. 22, 2020

Related U.S. Application Data

(60) Provisional application No. 62/835,789, filed on Apr. 18, 2019.

(51) Int. Cl.
*G06F 13/362* (2006.01)
*G06F 13/40* (2006.01)

(52) U.S. Cl.
CPC ........ *G06F 13/362* (2013.01); *G06F 13/4027* (2013.01)

(58) Field of Classification Search
CPC ............................ G06F 13/362; G06F 13/4027
USPC ........................................ 710/110, 200, 306
See application file for complete search history.

(56) References Cited

U.S. PATENT DOCUMENTS

| | | | |
|---|---|---|---|
| 3,953,835 A | 4/1976 | Cuccio et al. | |
| 5,412,644 A | 5/1995 | Herberle | |
| 5,459,660 A | 10/1995 | Berra | |
| 5,621,897 A * | 4/1997 | Boury | G06F 13/362 710/116 |
| 5,684,803 A | 11/1997 | Nguyen Thuy | |
| 5,734,847 A * | 3/1998 | Garbus | G06F 13/4027 710/1 |
| 5,774,680 A * | 6/1998 | Wanner | G06F 13/126 710/110 |
| 5,787,132 A | 7/1998 | Kishigami et al. | |

(Continued)

OTHER PUBLICATIONS

Non-Final Office Action for U.S. Appl. No. 14/575,491, dated May 26, 2017, 20 pages.

(Continued)

*Primary Examiner* — Paul R. Myers
(74) *Attorney, Agent, or Firm* — Withrow & Terranova, PLLC

(57) ABSTRACT

A hybrid bus apparatus is provided. The hybrid bus apparatus includes a hybrid bus bridge circuit configured to couple a master(s) with one or more auxiliary slaves via heterogeneous communication buses. The hybrid bus bridge circuit and the auxiliary slaves are associated with respective unique slave identifications (USIDs). The master(s) can only support a fixed number of the USIDs, and thus a fixed number of the auxiliary slaves. The hybrid bus bridge circuit is configured to opportunistically mask some or all of the auxiliary slaves such that the respective USIDs associated with the masked auxiliary slaves can be reused by the master(s) to support additional slaves. As such, it may be possible to extend the capability of the master(s) to support more slaves than the fixed number of USIDs the master(s) can provide, thus enabling flexible heterogeneous bus deployment in an electronic device incorporating the hybrid bus apparatus.

20 Claims, 4 Drawing Sheets

(56) References Cited

U.S. PATENT DOCUMENTS

| | | | |
|---|---|---|---|
| 5,832,207 A | 11/1998 | Little et al. | |
| 5,978,860 A * | 11/1999 | Chan | G06F 13/4063 |
| | | | 710/200 |
| 6,094,699 A * | 7/2000 | Surugucchi | G06F 13/404 |
| | | | 710/314 |
| 6,141,708 A * | 10/2000 | Tavallaei | G06F 13/4027 |
| | | | 710/100 |
| 6,189,063 B1 * | 2/2001 | Rekeita | G06F 13/4027 |
| | | | 370/402 |
| 6,292,705 B1 | 9/2001 | Wang et al. | |
| 6,308,255 B1 | 10/2001 | Gorishek, IV et al. | |
| 6,360,291 B1 * | 3/2002 | Tavallaei | G06F 13/4027 |
| | | | 710/100 |
| 6,397,279 B1 * | 5/2002 | Jaramillo | G06F 13/364 |
| | | | 710/105 |
| 6,408,163 B1 | 6/2002 | Fik | |
| 6,484,268 B2 | 11/2002 | Tamura et al. | |
| 6,985,990 B2 * | 1/2006 | Bronson | G06F 13/4027 |
| | | | 710/10 |
| 7,197,589 B1 * | 3/2007 | Deneroff | G06F 13/364 |
| | | | 710/118 |
| 7,519,005 B2 | 4/2009 | Hejdeman et al. | |
| 7,685,320 B1 | 3/2010 | Wishneusky | |
| 7,729,427 B2 | 6/2010 | Kwok | |
| 8,509,318 B2 | 8/2013 | Tailliet | |
| 8,694,710 B2 | 4/2014 | Bas et al. | |
| 8,775,707 B2 | 7/2014 | Poulsen | |
| 9,252,900 B2 | 2/2016 | Poulsen | |
| 9,430,321 B2 | 8/2016 | Slik | |
| 9,519,612 B2 | 12/2016 | Hietala et al. | |
| 9,569,386 B2 | 2/2017 | Du | |
| 9,639,500 B2 | 5/2017 | Bas et al. | |
| 9,652,451 B2 | 5/2017 | Elder | |
| 9,690,725 B2 | 6/2017 | Sengoku | |
| 9,755,821 B2 | 9/2017 | Jang et al. | |
| 9,946,677 B2 | 4/2018 | Hapke | |
| 10,185,683 B2 | 1/2019 | Ngo et al. | |
| 2001/0050713 A1 | 12/2001 | Kubo et al. | |
| 2004/0049619 A1 | 3/2004 | Lin | |
| 2004/0100400 A1 | 5/2004 | Perelman et al. | |
| 2004/0128594 A1 | 7/2004 | Elmhurst et al. | |
| 2004/0221067 A1 | 11/2004 | Huang et al. | |
| 2005/0012492 A1 | 1/2005 | Mihalka | |
| 2005/0185665 A1 | 8/2005 | Uboldi | |
| 2006/0031618 A1 | 2/2006 | Hansquine et al. | |
| 2006/0050694 A1 | 3/2006 | Bury et al. | |
| 2006/0152236 A1 | 7/2006 | Kim | |
| 2006/0236008 A1 | 10/2006 | Asano et al. | |
| 2009/0121825 A1 | 5/2009 | Har | |
| 2009/0248932 A1 | 10/2009 | Taylor et al. | |
| 2010/0305723 A1 | 12/2010 | Koyama | |
| 2010/0306430 A1 | 12/2010 | Takahashi | |
| 2011/0035632 A1 | 2/2011 | Hong et al. | |
| 2011/0113171 A1 | 5/2011 | Radhakrishnan et al. | |
| 2012/0027104 A1 | 2/2012 | Bas et al. | |
| 2012/0030753 A1 | 2/2012 | Bas et al. | |
| 2012/0226965 A1 | 9/2012 | Hammerschmidt et al. | |
| 2012/0303836 A1 | 11/2012 | Ngo et al. | |
| 2013/0054850 A1 | 2/2013 | Co | |
| 2013/0124763 A1 | 5/2013 | Kessler | |
| 2013/0132624 A1 | 5/2013 | Chen et al. | |
| 2013/0166801 A1 | 6/2013 | Chun et al. | |
| 2013/0197920 A1 | 8/2013 | Lesso et al. | |
| 2013/0265884 A1 | 10/2013 | Brombal et al. | |
| 2013/0301689 A1 | 11/2013 | Marchand et al. | |
| 2014/0025999 A1 | 1/2014 | Kessler | |
| 2014/0112339 A1 | 4/2014 | Safranek et al. | |
| 2014/0304442 A1 * | 10/2014 | Hietala | G06F 13/4291 |
| | | | 710/110 |
| 2014/0310436 A1 | 10/2014 | Du | |
| 2014/0376278 A1 | 12/2014 | Fornage et al. | |
| 2015/0056941 A1 | 2/2015 | Lin et al. | |
| 2015/0074306 A1 | 3/2015 | Ayyagari et al. | |
| 2015/0106541 A1 | 4/2015 | Southcombe et al. | |
| 2015/0127862 A1 | 5/2015 | Fan et al. | |
| 2015/0149673 A1 * | 5/2015 | Balkan | G06F 13/362 |
| | | | 710/110 |
| 2015/0169482 A1 | 6/2015 | Ngo et al. | |
| 2015/0192974 A1 | 7/2015 | Ngo et al. | |
| 2015/0193297 A1 | 7/2015 | Ngo et al. | |
| 2015/0193298 A1 | 7/2015 | Ngo et al. | |
| 2015/0193321 A1 | 7/2015 | Ngo et al. | |
| 2015/0193373 A1 | 7/2015 | Ngo et al. | |
| 2016/0050513 A1 | 2/2016 | Wang et al. | |
| 2016/0124892 A1 | 5/2016 | Amarillo et al. | |
| 2017/0255250 A1 | 9/2017 | Ngo et al. | |
| 2017/0255578 A1 | 9/2017 | Ngo et al. | |
| 2017/0255579 A1 * | 9/2017 | Ngo | G06F 13/404 |
| 2017/0277651 A1 * | 9/2017 | Ngo | G06F 13/364 |
| 2018/0217959 A1 | 8/2018 | Ngo et al. | |
| 2020/0151131 A1 | 5/2020 | Ngo et al. | |
| 2020/0394046 A1 | 12/2020 | Snelgrove et al. | |

OTHER PUBLICATIONS

Non-Final Office Action for U.S. Appl. No. 14/659,379, dated Apr. 7, 2017, 37 pages.

Author Unknown, "1-Wire," Wikipedia, last modified Jan. 16, 2015, accessed Feb. 12, 2015, http://en.wikipedia.org/wiki/1-Wire, 4 pages.

Author Unknown, "DS1822: Econo 1-Wire Digital Thermometer," Maxim Integrated, 2007, 21 pages.

Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).

Awtry, Dan, et al., "Design Guide v1.0," Springbok Digitronics, Aug. 19, 2004, 96 pages.

Non-Final Office Action for U.S. Appl. No. 14/575,491, dated Nov. 30, 2017, 18 pages.

Non-Final Office Action for U.S. Appl. No. 14/659,292, dated Sep. 29, 2017, 27 pages.

Final Office Action for U.S. Appl. No. 14/659,292, dated Apr. 30, 2018, 24 pages.

Non-Final Office Action for U.S. Appl. No. 14/659,328, dated Sep. 8, 2017, 51 pages.

Final Office Action for U.S. Appl. No. 14/659,328, dated Mar. 20, 2018, 61 pages.

Notice of Allowance for U.S. Appl. No. 14/659,328, dated Jul. 2, 2018, 8 pages.

Non-Final Office Action for U.S. Appl. No. 14/659,355, dated Sep. 20, 2017, 32 pages.

Final Office Action for U.S. Appl. No. 14/659,355, dated Apr. 17, 2018, 11 pages.

Advisory Action for U.S. Appl. No. 14/659,355, dated Jul. 5, 2018, 3 pages.

Non-Final Office Action for U.S. Appl. No. 15/467,790, dated Jun. 28, 2018, 14 pages.

Ex Parte Quayle Action for U.S. Appl. No. 15/365,315, dated Jul. 26, 2018, 7 pages.

Final Office Action for U.S. Appl. No. 14/659,379, dated Oct. 18, 2017, 44 pages.

Advisory Action for U.S. Appl. No. 14/659,379, dated Feb. 26, 2018, 3 pages.

Notice of Allowance for U.S. Appl. No. 14/659,379, dated Mar. 20, 2018, 10 pages.

Non-Final Office Action for U.S. Appl. No. 14/659,371, dated Sep. 25, 2017, 23 pages.

Final Office Action for U.S. Appl. No. 14/659,371, dated May 3, 2018, 21 pages.

Advisory Action for U.S. Appl. No. 14/659,371, dated Aug. 1, 2018, 3 pages.

Non-Final Office Action for U.S. Appl. No. 14/659,292, dated Dec. 21, 2018, 23 pages.

Final Office Action for U.S. Appl. No. 14/659,292, dated Jun. 4, 2019, 24 pages.

Non-Final Office Action for U.S. Appl. No. 14/659,355, dated Oct. 12, 2018, 8 pages.

(56) References Cited

OTHER PUBLICATIONS

Final Office Action for U.S. Appl. No. 14/659,355, dated May 2, 2019, 8 pages.
Non-Final Office Action for U.S. Appl. No. 15/886,209, dated May 17, 2019, 7 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Final Office Action for U.S. Appl. No. 15/365,295, dated Aug. 15, 2019, 11 pages.
Final Office Action for U.S. Appl. No. 15/467,790, dated Nov. 5, 2018, 15 pages.
Advisory Action for U.S. Appl. No. 15/467,790, dated Feb. 26, 2019, 3 pages.
Notice of Allowance for U.S. Appl. No. 15/467,790, dated May 20, 2019, 8 pages.
Non-Final Office Action for U.S. Appl. No. 15/443,236, dated Nov. 16, 2018, 19 pages.
Final Office Action for U.S. Appl. No. 15/443,236, dated May 30, 2019, 20 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Notice of Allowance for U.S. Appl. No. 15/886,209, dated Sep. 11, 2019, 7 pages.
Notice of Allowance for U.S. Appl. No. 16/402,613, dated Nov. 4, 2019, 9 pages.
Notice of Allowance for U.S. Appl. No. 16/407,397, dated Nov. 12, 2019, 7 pages.
Advisory Action for U.S. Appl. No. 15/365,295, dated Nov. 6, 2019, 3 pages.
Corrected Notice of Allowance for U.S. Appl. No. 15/467,790, dated Aug. 15, 2019, 6 pages.
Corrected Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.
Non-Final Office Action for U.S. Appl. No. 16/736,164, dated Feb. 27, 2020, 7 pages.
International Search Report and Written Opinion for International Patent Application No. PCT/US2020/012702, dated Apr. 7, 2020, 17 pages.
Notice of Allowance for U.S. Appl. No. 15/365,295, dated Feb. 25, 2020, 8 pages.
Awtry, Dan, "Transmitting Data and Power over a One-Wire Bus," Sensors, Feb. 1997, Dallas Semiconductor, 4 pages.
Final Office Action for U.S. Appl. No. 16/736,164, dated Jun. 2, 2020, 7 pages.
Non-Final Office Action for U.S. Appl. No. 16/549,116, dated Aug. 6, 2020, 9 pages.
Non-Final Office Action for U.S. Appl. No. 16/710,457, dated Aug. 28, 2020, 7 pages.
Final Office Action for U.S. Appl. No. 16/736,164, dated Jan. 11, 2021, 10 pages.
Advisory Action for U.S. Appl. No. 16/736,164, dated Mar. 19, 2021, 3 pages.
Final Office Action for U.S. Appl. No. 16/549,116, dated Jan. 13, 2021, 9 pages.
Advisory Action for U.S. Appl. No. 16/549,116, dated Mar. 24, 2021, 3 pages.
Notice of Allowance for U.S. Appl. No. 16/736,164, dated Apr. 29, 2021, 8 pages.
Non-Final Office Action and Examiner-Initiated Interview Summary for U.S. Appl. No. 16/549,116, dated May 12, 2021, 10 pages.
International Preliminary Report on Patentability for International Patent Application No. PCT/US2020/012702, dated Jul. 29, 2021, 11 pages.

* cited by examiner

HYBRID BUS APPARATUS

RELATED APPLICATIONS

This application claims the benefit of U.S. provisional patent application Ser. No. 62/835,789, filed on Apr. 18, 2019, the disclosure of which is incorporated herein by reference in its entirety.

FIELD OF THE DISCLOSURE

The technology of the disclosure relates generally to a hybrid bus apparatus incorporating heterogeneous communication buses.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, a radio frequency (RF) signal(s) may first be modulated by a transceiver circuit(s) based on a selected modulation and coding scheme (MCS) and then amplified by a power amplifier(s) prior to being radiated from an antenna(s). In many wireless communication devices, the power amplifier(s) and the antenna(s) are typically located in an RF front-end (RFFE) circuit communicatively coupled to the transceiver circuit(s) via an RFFE bus as defined in the MIPI® alliance specification for radio frequency front-end control interface, version 2.1 (hereinafter referred to as "RFFE specification").

In this regard, FIG. 1 is a schematic diagram of an exemplary RFFE bus apparatus 10 as defined in the RFFE specification. The RFFE bus apparatus 10 includes an RFFE master 12 coupled to a number of RFFE slaves 14(1)-14(M) over an RFFE bus 16. According to the RFFE specification, the RFFE bus 16 is a two-wire serial bus that includes a data line 18 and a clock line 20 for communicating a bidirectional data signal SDATA and a clock signal SCLK, respectively. The RFFE bus 16 operates at a first data rate.

Further according to the RFFE specification, each of the RFFE slaves 14(1)-14(M) is required to have a unique slave identification (USID) and the RFFE bus apparatus 10 can support fifteen (15) USIDs between hexadecimal value 0x1 and hexadecimal value 0xF (0x1-0xF). The RFFE specification further assigns hexadecimal value 0x0 to represent a broadcast slave identification (BSID) for all the RFFE slaves 14(1)-14(M). According to the RFFE specification, each of the RFFE slaves 14(1)-14(M) is assigned one of the 15 USIDs by a system integrator. Accordingly, in the RFFE bus apparatus 10, it is possible to connect up to 15 RFFE slaves 14(1)-14(15) to the RFFE master 12 via the RFFE bus 16.

The RFFE specification also allows any of the 15 USIDs to be used as a group slave identification (GSID) to identify an RFFE slave group. For example, the RFFE bus apparatus 10 includes five RFFE slaves associated with USIDs 0x1-0x5, respectively. The RFFE slaves associated with USIDs 0x1-0x3 may be clustered into a first RFFE slave group and the RFFE slaves associated with USIDs 0x4-0x5 may be clustered into a second RFFE slave group. The first RFFE slave group and the second RFFE slave group may be assigned USIDs 0x6 and 0x7, respectively. In this regard, the USIDs 0x6 and 0x7 are now used as GSIDs to identify the first RFFE slave group and the second RFFE slave group, respectively. Notably, there will be a lesser number of USIDs available to identify the RFFE slaves 14(1)-14(M) if any of the 15 USIDs are used to represent a GSID.

The RFFE master 12 is configured to communicate with the RFFE slaves 14(1)-14(M) based on RFFE command sequences (e.g., register-write command sequence, register-read command sequence, trigger command sequence, etc.). According to the RFFE specification, only the RFFE master 12 can initiate an RFFE command sequence on the RFFE bus 16.

Each of the RFFE command sequences can be associated with a USID, a GSID, or a BSID. When an RFFE command sequence is communicated based on a specific USID, the RFFE command sequence is addressed to a specific RFFE slave among the RFFE slaves 14(1)-14(M) that is identified by the specific USID. When an RFFE command sequence is communicated based on a specific GSID, the RFFE command sequence is addressed to respective RFFE slaves among the RFFE slaves 14(1)-14(M) associated with the specific GSID. For example, if the command sequence is communicated with GSID 0x6, then the command sequence will be addressed to the RFFE slaves associated with the GSID of 0x6. When an RFFE command sequence is communicated based on the BSID, all of the RFFE slaves 14(1)-14(M) on the RFFE bus 16 will be able to receive the RFFE command sequence.

However, not all communications require a two-wire serial bus like the RFFE bus 16. In some cases, a single-wire serial bus may be sufficient or even desired for carrying out certain types of communications between circuits. In this regard, FIG. 2 is a schematic diagram of an exemplary single-wire bus (SuBUS) apparatus 22 in which a SuBUS bridge circuit 24 is configured to bridge communications between the RFFE master 12 in FIG. 1 with one or more SuBUS slaves 26(1)-26(N). Common elements between FIGS. 1 and 2 are shown therein with common element numbers and will not be re-described herein.

The SuBUS bridge circuit 24 is coupled to the SuBUS slaves 26(1)-26(N) over a SuBUS 28 having a single data wire 30. Accordingly, the SuBUS 28 is configured to operate at a second data rate that can be faster or slower than the first data rate of the RFFE bus 16. The SuBUS bridge circuit 24 may be coupled to the RFFE master 12 via the RFFE bus 16. In this regard, the SuBUS bridge circuit 24 and the SuBUS slaves 26(1)-26(N) are also RFFE slaves, such as the RFFE slaves 14(1)-14(M) coupled to the RFFE master 12 in the RFFE bus apparatus 10 of FIG. 1. In this regard, the SuBUS bridge circuit 24 and the SuBUS slaves 26(1)-26(N) are configured to be identified by the RFFE master 12 based on the 15 USIDs ranging from hexadecimal value 0x1 to hexadecimal value 0xF (0x1-0xF).

Notably, the SuBUS 28 differs from the RFFE bus 16 in several aspects. First, the RFFE bus 16 includes the data line 18 and the clock line 20, while the SuBUS 28 includes only the single data wire 30. Second, the SuBUS bridge circuit 24 is configured to communicate with the SuBUS slaves 26(1)-26(N) based on SuBUS command sequences, which may be compatible but different from the RFFE command sequences communicated over the RFFE bus 16. In this regard, the SuBUS bridge circuit 24 may perform command conversion between the RFFE command sequences and the SuBUS command sequences to facilitate communications between the RFFE bus 16 and the SuBUS 28. Third, the RFFE bus 16 may be configured to operate at the first data rate and the SuBUS 28 may be configured to operate at the second data rate, which is different from the first data rate. In this regard, the SuBUS bridge circuit 24 may buffer SuBUS data payloads prior to communicating over the RFFE bus 16 to help compensate for a difference between the first data rate and the second data rate.

Similar to the RFFE slaves 14(1)-14(M) in FIG. 1, the SuBUS bridge circuit 24 and the SuBUS slaves 26(1)-26(N) need to be respectively identified by a USID. As discussed in FIG. 1, the RFFE bus apparatus 10 can support 15 USIDs between hexadecimal value 0x1 and hexadecimal value 0xF (0x1-0xF). In this regard, the SuBUS bridge circuit 24 can be identified by a specially assigned USID among the 15 available USIDs and the SuBUS slaves 26(1)-26(N) can be identified by the remaining 14 USIDs excluding the specially assigned USID. For example, if the SuBUS bridge circuit 24 is identified by the specially assigned USID of 0x1, then the SuBUS slaves 26(1)-26(N) can only be identified by USIDs ranging from 0x2 to 0xF. Like the RFFE slaves 14(1)-14(M), the SuBUS slaves 26(1)-26(N) may also be accessed via a BSID and a GSID as previously described in FIG. 1.

The SuBUS apparatus 22 may be employed in combination with the RFFE bus apparatus 10 to enable flexible heterogeneous bus deployment in an electronic device (e.g., a smartphone). However, as discussed above, the RFFE bus 16 can only support up to 14 heterogeneous (e.g., RFEE and SuBUS) slaves based on 14 USIDs. In some cases, it may be necessary to support more than 14 heterogeneous slaves over the RFFE bus 16 in the electronic device. Accordingly, the RFFE specification further provides an option of having multiple RFFE buses and assigning RFFE slaves on separate RFFE buses with conflicting USIDs.

However, it may be challenging to incorporate additional RFFE buses in such space-constrained electronic devices as smartphones. First of all, to support each additional RFFE bus, the RFFE master 12 must provide two additional physical pins for connecting a data line like the data line 18 and a clock line like the clock line 20. This can be very difficult given that the RFFE master 12 can be a transceiver circuit that already has to provide a number of physical pins for connecting to a variety of components and/or circuits. Second, the RFFE master 12 and the SuBUS slaves 26(1)-26(N) may be located in different sections of an electronic device. For example, the RFFE master 12 can be located in a center of the electronic device, while the SuBUS bridge circuit 24 and/or the SuBUS slaves 26(1)-26(N) are placed close to edges of the electronic device. In this regard, it may be more complicated to make room for the additional RFFE bus and route the additional RFFE bus from the RFFE master 12 to the SuBUS bridge circuit 24 and/or the SuBUS slaves 26(1)-26(N). Hence, it may be desired to concurrently support more than 14 RFFE and SuBUS slaves in the electronic device without adding an additional RFFE bus.

SUMMARY

Aspects disclosed in the detailed description include a hybrid bus apparatus. The hybrid bus apparatus includes a hybrid bus bridge circuit configured to couple a master(s) with one or more auxiliary slaves via heterogeneous communication buses. The hybrid bus bridge circuit and the auxiliary slaves are slaves to the master(s) and associated with respective unique slave identifications (USIDs). Notably, the master(s) can only support a fixed number (e.g., 15) of the USIDs, and thus a fixed number of the auxiliary slaves. In this regard, the hybrid bus bridge circuit is configured to opportunistically mask some or all of the auxiliary slaves such that the respective USIDs associated with the masked auxiliary slaves can be reused by the master(s) to support additional slaves. As a result, it may be possible to extend the capability of the master(s) to support more slaves than the fixed number of USIDs the master(s) can provide, thus enabling flexible heterogeneous bus deployment in an electronic device (e.g., a smartphone) incorporating the hybrid bus apparatus.

In one aspect, a hybrid bus apparatus is provided. The hybrid bus apparatus includes at least one master. The hybrid bus apparatus also includes one or more auxiliary slaves corresponding to one or more USIDs, respectively. The hybrid bus apparatus also includes a hybrid bus bridge circuit. The hybrid bus bridge circuit includes at least one primary port coupled to the at least one master via at least one primary bus. The hybrid bus bridge circuit also includes at least one auxiliary port coupled to the one or more auxiliary slaves via at least one auxiliary bus. The hybrid bus bridge circuit also includes a register circuit comprising at least one slave mask corresponding to the at least one master and the at least one auxiliary bus. The at least one slave mask is configured to mask at least one selected auxiliary slave among the one or more auxiliary slaves corresponding to at least one selected USID among the one or more USIDs. The hybrid bus bridge circuit also includes a control circuit configured to block a communication between the at least one master and the at least one selected auxiliary slave based on the at least one slave mask.

In another aspect, a hybrid bus bridge circuit is provided. The hybrid bus bridge circuit includes at least one primary port coupled to at least one master via at least one primary bus. The hybrid bus bridge circuit also includes at least one auxiliary port coupled to one or more auxiliary slaves via at least one auxiliary bus. The hybrid bus bridge circuit also includes a register circuit comprising at least one slave mask corresponding to the at least one master and the at least one auxiliary bus. The at least one slave mask is configured to mask at least one selected auxiliary slave among the one or more auxiliary slaves corresponding to at least one selected USID among one or more USIDs. The hybrid bus bridge circuit also includes a control circuit configured to block a communication between the at least one master and the at least one selected auxiliary slave based on the at least one slave mask.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1:
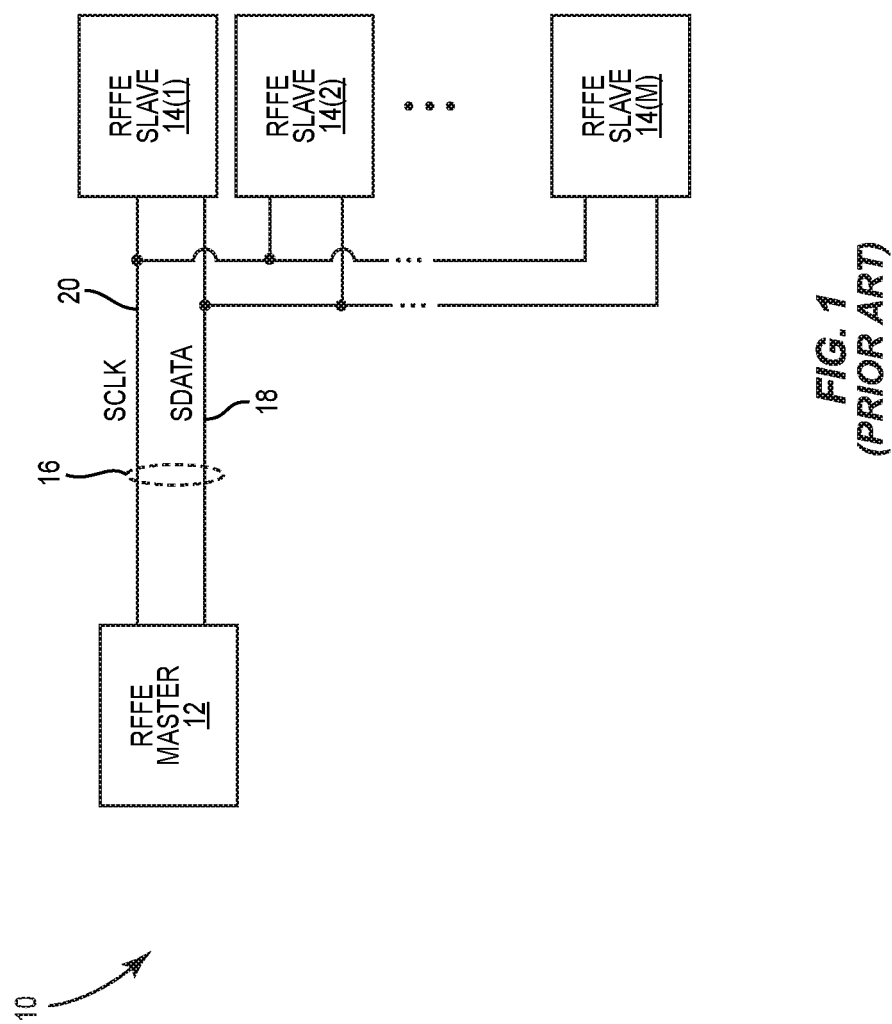
FIG. 1 is a schematic diagram of an exemplary radio frequency front-end (RFFE) bus apparatus as defined in the MIPI® alliance specification for radio frequency (RF) front-end control interface, version 2.1.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a hybrid bus apparatus. The hybrid bus apparatus includes a hybrid bus bridge circuit configured to couple a master(s) with one or more auxiliary slaves via heterogeneous communication buses. The hybrid bus bridge circuit and the auxiliary slaves are slaves to the master(s) and associated with respective unique slave identifications (USIDs). Notably, the master(s) can only support a fixed number (e.g., 15) of the USIDs, and thus a fixed number of the auxiliary slaves. In this regard, the hybrid bus bridge circuit is configured to opportunistically mask some or all of the auxiliary slaves such that the respective USIDs associated with the masked auxiliary slaves can be reused by the master(s) to support additional slaves. As a result, it may be possible to extend the capability of the master(s) to support more slaves than the fixed number of USIDs the master(s) can provide, thus enabling flexible heterogeneous bus deployment in an electronic device (e.g., a smartphone) incorporating the hybrid bus apparatus.

Figure 3:
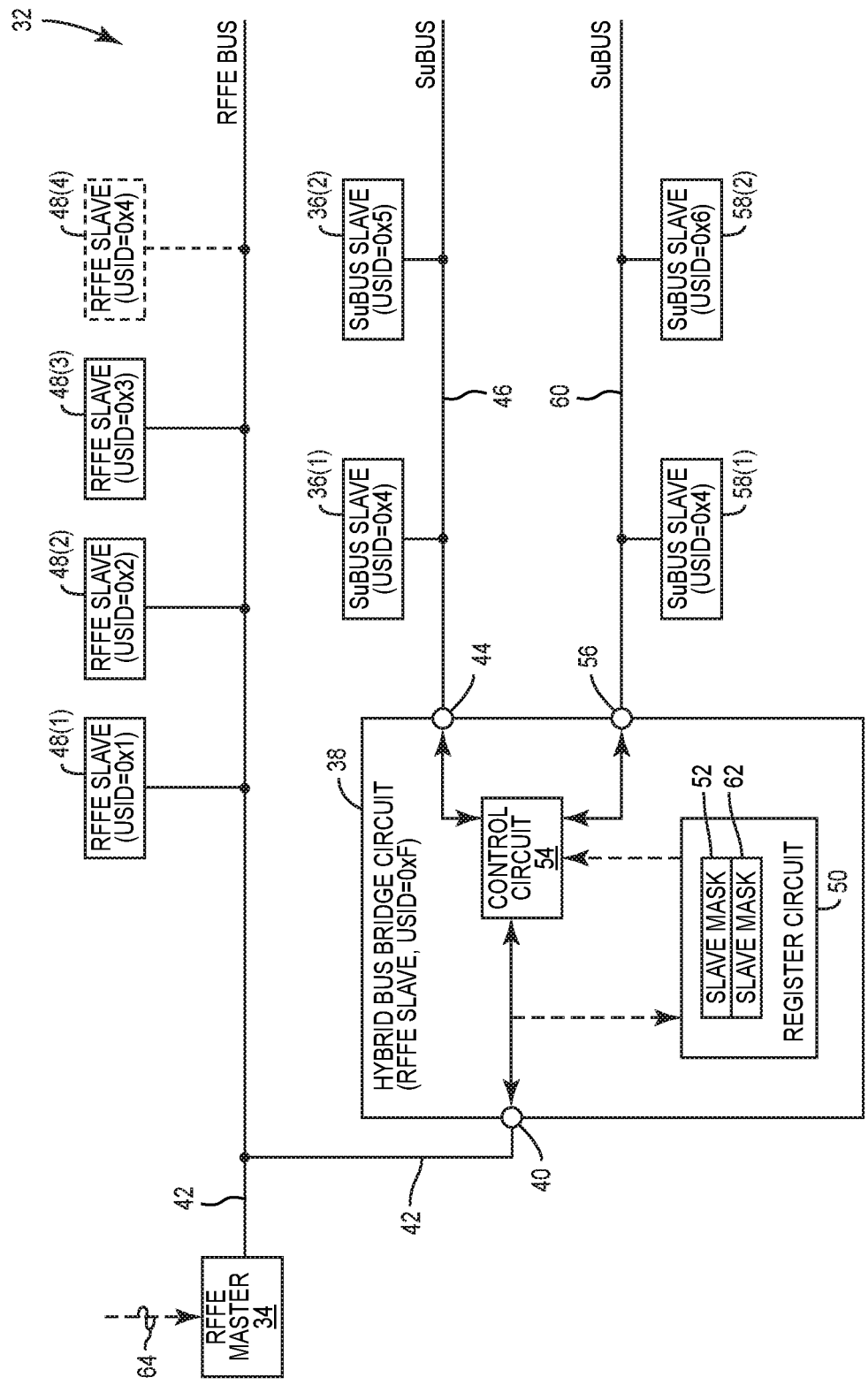
FIG. 3 is a schematic diagram of an exemplary hybrid bus apparatus configured according to an embodiment of the present disclosure to support more slaves than available unique slave identifications (USIDs)

In this regard, FIG. 3 is a schematic diagram of an exemplary hybrid bus apparatus 32 configured according to an embodiment of the present disclosure to support more slaves than available USIDs. The hybrid bus apparatus 32 includes at least one master 34 and one or more auxiliary slaves 36(1), 36(2). The hybrid bus apparatus 32 also includes a hybrid bus bridge circuit 38 configured to couple the master 34 with the auxiliary slaves 36(1), 36(2). In a non-limiting example, the hybrid bus bridge circuit 38 includes at least one primary port 40, which is coupled to the master 34 via at least one primary bus 42, and at least one auxiliary port 44, which is coupled to the auxiliary slaves 36(1), 36(2) via at least one auxiliary bus 46. It should be appreciated that the auxiliary slaves 36(1), 36(2) are merely non-limiting examples for the purpose of illustration and the auxiliary port 44 can be coupled to additional auxiliary slaves via the auxiliary bus 46.

In examples discussed hereinafter, the primary bus 42 can be a radio frequency front-end (RFFE) bus, such as the RFFE bus 16 in FIG. 2, and the auxiliary bus 46 can be a single-wire bus (SuBUS), such as the SuBUS 28 in FIG. 2. In this regard, the primary bus 42 and the auxiliary bus 46 are different type of communication buses. However, it may also be possible to configure the primary bus 42 and the auxiliary bus 46 to be a same type of communication bus.

Figure 2:
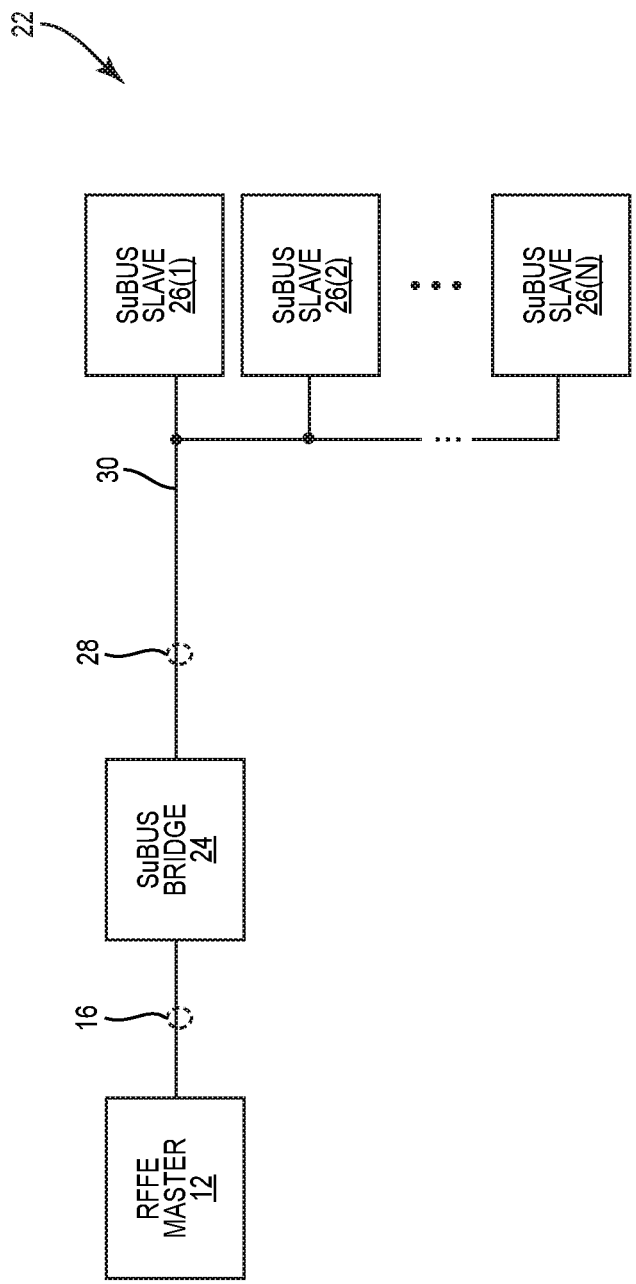
FIG. 2 is a schematic diagram of an exemplary single-wire bus (SuBUS) apparatus in which a SuBUS bridge circuit is configured to bridge communications between an RFFE master in the RFFE bus apparatus of FIG. 1 with one or more SuBUS slaves in the SuBUS apparatus.

When the primary bus 42 and the auxiliary bus 46 are an RFFE bus 42 and a SuBUS 46, respectively, the master 34 becomes an RFFE master 34, such as the RFFE master 12 in FIG. 2, and the auxiliary slaves 36(1), 36(2) become SuBUS slaves 36(1), 36(2), such as the SuBUS slaves 26(1)-26(N) in FIG. 2. Further, the hybrid bus bridge circuit 38 may play a similar role as the SuBUS bridge circuit 24 in FIG. 2. In this regard, the hybrid bus bridge circuit 38 and the auxiliary slaves 36(1), 36(2) are each associated with a respective USID. For example, the hybrid bus bridge circuit 38 is associated with USID=0xF, and the auxiliary slaves 36(1), 36(2) are associated with USID=0x4 and USID=0x5, respectively.

The master 34 may be further configured to support one or more primary slaves 48(1)-48(3), such as the RFFE slaves 14(1)-14(M) in FIG. 1, via the primary bus 42. In this regard, each of the primary slaves 48(1)-48(3) is also associated with a respective USID. For example, the primary slaves 48(1)-48(3) can be associated with USID=0x1, USID=0x2, and USID=0x3, respectively.

As previously discussed in FIGS. 1 and 2, the MIPI® alliance specification for radio frequency front-end control interface, version 2.1 (hereinafter referred to as "RFFE specification") only allows the master 34 to support up to fifteen (15) USIDs (0x1-0xF), and therefore up to 15 slaves, on the primary bus 42. However, in certain deployment scenarios, it may be desirable for the master 34 to support more than 15 slaves without adding an additional primary bus in the hybrid bus apparatus 32.

In this regard, the hybrid bus bridge circuit 38 can be configured to include a register circuit 50, such as a register bank consisting of a number of registers. The register circuit 50 can be configured to include at least one slave mask 52 corresponding to the master 34 and the auxiliary bus 46. The slave mask 52 may be stored in a register(s) in the register bank. The slave mask 52 may be configured to mask at least one selected auxiliary slave, such as the auxiliary slave 36(1), that is associated with at least one selected USID (e.g., USID=0x4). By masking the selected auxiliary slave 36(1) in the slave mask 52, the hybrid bus bridge circuit 38 may hide the selected auxiliary slave 36(1), as well as the selected USID (USID=0x4) associated with the selected auxiliary slave 36(1), from the master 34. As a result, the master 34 may reuse the selected USID (USID=0x4) to address an additional primary slave 48(4) on the primary bus 42.

The hybrid bus bridge circuit 38 can be configured to include a control circuit 54, which can be a microprocessor, a microcontroller, or a field-programmable gate array (FPGA), as an example. The control circuit 54 may be configured to block a communication between the master 34 and the selected auxiliary slave 36(1) such that the master 34 can reuse the selected USID (USID=0x4) to address the additional primary slave 48(4).

Notably, the control circuit 54 may still receive command telegrams (e.g., RFFE read/write) destined from the master 34 to the selected auxiliary slave 36(1) and/or data payloads destined from the selected auxiliary slave 36(1) to the master 34. In this regard, the control circuit 54 may be configured to filter the command telegrams and the data payloads. Accordingly, the control circuit 54 may drop the command telegrams communicated from the master 34 to the selected auxiliary slave 36(1) and the data payloads communicated from the selected auxiliary slave 36(1) to the master 34.

In contrast to the selected auxiliary slave 36(1), the slave mask 52 may be configured not to mask the auxiliary slave 36(2). As such, the auxiliary slave 36(2) is visible to the master 34. Accordingly, the control circuit 54 is configured to bridge the command telegrams sent from the master 34 toward the auxiliary slave 36(2) as well as the data payloads sent from the auxiliary slave 36(2) toward the master 34.

The hybrid bus bridge circuit 38 may include at least one second auxiliary port 56 coupled to one or more second auxiliary slaves 58(1), 58(2) via at least one second auxiliary bus 60. It should be appreciated that the second auxiliary slaves 58(1), 58(2) are merely non-limiting examples for the purpose of illustration and the second auxiliary port 56 can be coupled to additional second auxiliary slaves via the second auxiliary bus 60. In a non-limiting example, the second auxiliary bus 60 is a same type of communication bus as the auxiliary bus 46 (e.g., a SuBUS). Similar to the auxiliary slaves 36(1), 36(2), the second auxiliary slaves 58(1), 58(2) are respectively associated with one or more second USIDs. For example, the second auxiliary slaves 58(1), 58(2) are associated with a second USID=0x4 and a second USID=0x6, respectively.

Notably, the second auxiliary slave 58(1) is associated with an identical USID (USID=0x4) as the selected auxiliary slave 36(1). As such, it may be necessary to hide the selected auxiliary slave 36(1) or the second auxiliary slave 58(1) from the master 34 to help avoid a potential USID conflict. In this regard, the register circuit 50 may be configured to include at least one second slave mask 62 corresponding to the master 34 and the second auxiliary bus 60. The second slave mask 62 may be configured to mask at least one selected second auxiliary slave, such as the second auxiliary slave 58(1), that is associated with at least one selected second USID, such as the second USID=0x4.

At any given time, only the selected auxiliary slave 36(1) or the selected second auxiliary slave 58(1) can be allowed to communicate command telegrams and/or data payloads with the master 34. In this regard, the control circuit 54 is configured to selectively hide the selected auxiliary slave 36(1) or the selected second auxiliary slave 58(1) from the master 34 based on the slave mask 52 or the second slave mask 62.

For example, if the selected auxiliary slave 36(1) is masked by the slave mask 52 and the selected second auxiliary slave 58(1) is not masked by the second slave mask 62, the control circuit 54 should hide the selected auxiliary slave 36(1) from the master 34, while making the selected second auxiliary slave 58(1) visible to the master 34. Accordingly, the control circuit 54 is configured to block the communication between the master 34 and the selected auxiliary slave 36(1), while bridging the communication between the master 34 and the selected second auxiliary slave 58(1).

In contrast, if the selected auxiliary slave 36(1) is not masked by the slave mask 52 and the selected second auxiliary slave 58(1) is masked by the second slave mask 62, the control circuit 54 should make the selected auxiliary slave 36(1) visible to the master 34, while hiding the selected second auxiliary slave 58(1) from the master 34. Accordingly, the control circuit 54 is configured to bridge the communication between the master 34 and the selected auxiliary slave 36(1), while blocking the communication between the master 34 and the selected second auxiliary slave 58(1).

The second slave mask 62 may be configured to not mask the second auxiliary slave 58(2). As such, the second auxiliary slave 58(2) is visible to the master 34. Accordingly, the control circuit 54 is configured to bridge the communication between the master 34 and the second auxiliary slave 58(2).

The slave mask 52 and/or the second slave mask 62 can be statically or dynamically configured. The master 34 may be configured to statically or dynamically write to and/or read from the slave mask 52 and/or the second slave mask 62. In a non-limiting example, the master 34 can receive a configuration signal 64 (e.g., from a digital signal processor) and update the slave mask 52 and/or the second slave mask 62 accordingly. It should be appreciated that the slave mask 52 and/or the second slave mask 62 can also be generated in alternative methods without affecting operational principles of the hybrid bus bridge circuit 38.

Figure 4:
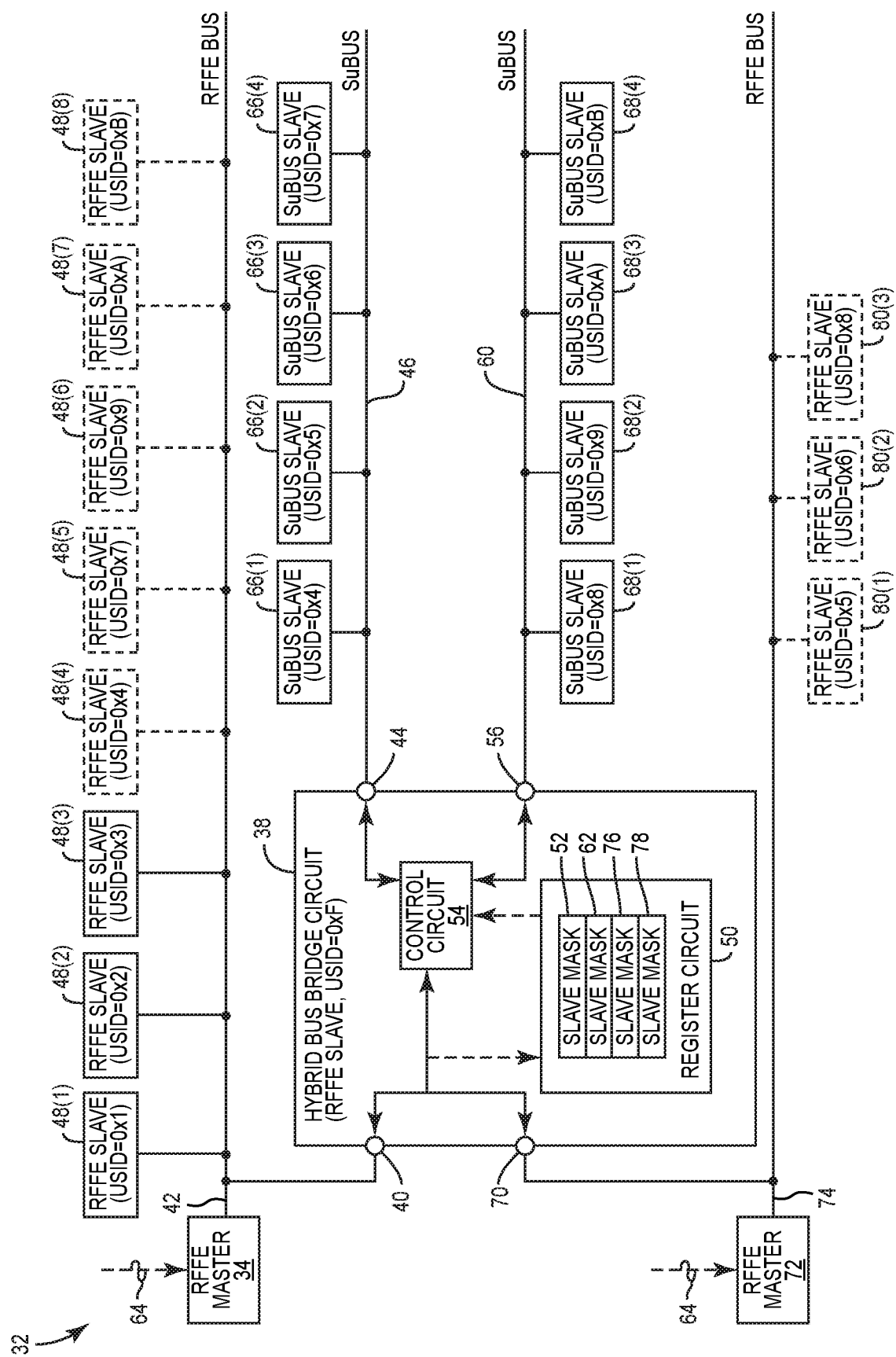
FIG. 4 is a schematic diagram providing a further illustration of the hybrid bus apparatus of FIG. 3.

FIG. 4 is a schematic diagram providing a further illustration of the hybrid bus apparatus 32 of FIG. 3. Common elements between FIGS. 3 and 4 are shown therein with common element numbers and will not be re-described herein.

As shown in FIG. 4, the hybrid bus bridge circuit 38 is coupled to one or more auxiliary slaves 66(1)-66(4) via the auxiliary bus 46 and one or more second auxiliary slaves 68(1)-68(4) via the second auxiliary bus 60. In a non-limiting example, the auxiliary slaves 66(1)-66(4) are respectively associated with USID=0x4, USID=0x5, USID=0x6, and USID=0x7, and the second auxiliary slaves 68(1)-68(4) are respectively associated with USID=0x8, USID=0x9, USID=0xA, and USID=0xB. It should be appreciated that the auxiliary slaves 66(1)-66(4) and the second auxiliary slaves 68(1)-68(4) are merely non-limiting examples for the purpose of illustration and the hybrid bus bridge circuit 38 can be coupled to additional auxiliary slaves via the auxiliary bus 46 and/or the second auxiliary bus 60.

The hybrid bus bridge circuit 38 may include at least one second primary port 70 that is coupled to at least one second master 72 via at least one second primary bus 74. The second primary bus 74 may be the same type of bus as the primary bus 42 (e.g., a RFFE bus). In this regard, the hybrid bus bridge circuit 38 is a slave to the master 34 on the primary bus 42 and a slave to the second master 72 on the second primary bus 74.

The register circuit 50 includes the slave mask 52 corresponding to the master 34 and the auxiliary bus 46, and the second slave mask 62 corresponding to the master 34 and the second auxiliary bus 60. By adding the second master 72 into the hybrid bus apparatus 32, the register circuit 50 needs to further include at least one third slave mask 76 corresponding to the second master 72 and the auxiliary bus 46, and at least one fourth slave mask 78 corresponding to the second master 72 and the second auxiliary bus 60. In essence, there needs to be a respective slave mask(s) in the register circuit 50 for each "master-auxiliary bus" combination.

In a non-limiting example, the slave mask 52 is configured to mask the auxiliary slave 66(1) (USID=0x4) and the auxiliary slave 66(4) (USID=0x7). In the same non-limiting example, the second slave mask 62 is configured to mask the second auxiliary slave 68(2) (USID=0x9), the second auxiliary slave 68(3) (USID=0xA), and the second auxiliary slave 68(4) (USID=0xB).

In this regard, the control circuit 54 is configured to block the master 34 from communicating with the auxiliary slaves 66(1), 66(4) as well as the second auxiliary slaves 68(2), 68(3), 68(4), while allowing the master 34 to communicate with the auxiliary slaves 66(2), 66(3) and the second auxiliary slave 68(1). As a result, the master 34 may reuse the USID=0x4 of the auxiliary slave 66(1), the USID=0x7 of the auxiliary slave 66(4), the USID=0x9 of the second auxiliary slave 68(2), the USID=0xA of the second auxiliary slave 68(3), and the USID=0xB of the second auxiliary slave 68(4) to support additional primary slaves 48(4)-48(8) on the primary bus 42.

In the same non-limiting example, the third slave mask 76 is configured to mask at least one second selected auxiliary slave, such as the auxiliary slave 66(2) (USID=0x5) and the auxiliary slave 66(3) (USID=0x6). In the same non-limiting example, the fourth slave mask 78 is configured to mask at least one second selected second auxiliary slave, such as the second auxiliary slave 68(1) (USID=0x8).

In this regard, the control circuit 54 is configured to block the second master 72 from communicating with the auxiliary slaves 66(2), 66(3) and the second auxiliary slave 68(1), while allowing the second master 72 to communicate with the auxiliary slaves 66(1), 66(4) and the second auxiliary slaves 68(2), 68(3), 68(4). As a result, the second master 72 may reuse the USID=0x5 of the auxiliary slave 66(2), the USID=0x6 of the auxiliary slave 66(3), and the USID=0x8 of the second auxiliary slave 68(1) to support second primary slaves 80(1)-80(3) on the second primary bus 74.

The register circuit 50 can be configured in a number of ways to maintain the slave mask 52, the second slave mask 62, the third slave mask 76, and the fourth slave mask 78. In one non-limiting example, the slave mask 52, the second slave mask 62, the third slave mask 76, and the fourth slave mask 78 can be represented by respective bitmaps, as shown in Table 1 below.

TABLE 1

| Master ID | Auxiliary Bus ID | Slave Mask Bitmap |
|---|---|---|
| 34 | 46 | 1001 |
| 34 | 60 | 0111 |
| 72 | 46 | 0110 |
| 72 | 60 | 1000 |

In Table 1 above, the first row corresponds to the slave mask 52, the second row corresponds to the second slave mask 62, the third row corresponds to the third slave mask 76, and the fourth row corresponds to the fourth slave mask 78. In the slave mask 52, the slave mask bitmap 1001 is configured to mask the auxiliary slaves 66(1), 66(4) based on respective positions of the auxiliary slaves 66(1), 66(4) on the auxiliary bus 46. In the second slave mask 62, the slave mask bitmap 0111 is configured to mask the second auxiliary slaves 68(2), 68(3), 68(4) based on respective positions of the second auxiliary slaves 68(2), 68(3), 68(4) on the second auxiliary bus 60. In the third slave mask 76, the slave mask bitmap 0110 is configured to mask the auxiliary slaves 66(2), 66(3) based on respective positions of the auxiliary slaves 66(2), 66(3) on the auxiliary bus 46. In the fourth slave mask 78, the slave mask bitmap 1000 is configured to mask the second auxiliary slave 68(1) based on the respective position of the second auxiliary slave 68(1) on the second auxiliary bus 60.

Alternatively, it may also be possible to configure each of the slave mask 52, the second slave mask 62, the third slave mask 76, and the fourth slave mask 78 as a respective list of USID entries, as shown in Table 2 below.

TABLE 2

| Master ID | Auxiliary Bus ID | USID Entry |
|---|---|---|
| 34 | 46 | USID = 0x4 |
| 34 | 46 | USID = 0x7 |
| 34 | 60 | USID = 0x9 |
| 34 | 60 | USID = 0xA |
| 34 | 60 | USID = 0xB |
| 72 | 46 | USID = 0x5 |
| 72 | 46 | USID = 0x6 |
| 72 | 60 | USID = 0x8 |

In Table 2 above, rows 1 and 2 correspond to the slave mask 52, rows 3, 4, and 5 correspond to the second slave mask 62, rows 6 and 7 correspond to the third slave mask 76, and row 8 corresponds to the fourth slave mask 78. In this regard, the slave mask 52 is configured to identify the auxiliary slaves 66(1), 66(4) by USID=0x4 and USID=0x7, respectively. The second slave mask 62 is configured to identify the second auxiliary slaves 68(2), 68(3), 68(4) by USID=0x9, USID=0xA, and USID=0xB, respectively. The third slave mask 76 is configured to identify the auxiliary slaves 66(2), 66(3) by USID=0x5 and USID=0x6, respectively. The fourth slave mask 78 is configured to identify the second auxiliary slave 68(1) by USID=0x8.

Notably, Table 1 and Table 2 are merely non-limiting examples for configuring the slave mask 52, the second slave mask 62, the third slave mask 76, and the fourth slave mask 78 in the register circuit 50. It should be appreciated it may also be possible to configure the slave mask 52, the second slave mask 62, the third slave mask 76, and the fourth slave mask 78 in other methods, without affecting the operational principles of the hybrid bus bridge circuit 38.

Both the master 34 and the second master 72 may be configured to read from and/or write to each of the slave mask 52, the second slave mask 62, the third slave mask 76, and the fourth slave mask 78. In this regard, the master 34 and the second master 72 can both be aware of how USIDs are used in the hybrid bus apparatus 32.

Those skilled in the art will recognize improvements and modifications to the embodiments of the present disclosure. All such improvements and modifications are considered within the scope of the concepts disclosed herein and the claims that follow.

What is claimed is:

1. A hybrid bus apparatus comprising:
   at least one master coupled to one or more primary slaves via at least one primary bus;
   one or more auxiliary slaves corresponding to one or more unique slave identifications (USIDs), respectively; and
   a hybrid bus bridge circuit comprising:
      at least one primary port coupled to the at least one master via the at least one primary bus;
      at least one auxiliary port coupled to the one or more auxiliary slaves via at least one auxiliary bus consisting of a single wire;
      a register circuit comprising at least one slave mask corresponding to the at least one master and the at least one auxiliary bus, the at least one slave mask configured to mask at least one selected auxiliary slave among the one or more auxiliary slaves corresponding to at least one selected USID among the one or more USIDs; and
      a control circuit configured to block a communication between the at least one master and the at least one selected auxiliary slave based on the at least one slave mask such that the at least one master can reuse the at least one selected USID corresponding to the at least one selected auxiliary slave masked by the at least one slave mask to communicate with at least one of the one or more primary slaves.

2. The hybrid bus apparatus of claim 1 wherein:
   the at least one primary bus corresponds to at least one radio frequency front-end (RFFE) bus; and
   the at least one auxiliary bus corresponds to at least one single-wire bus (SuBUS).

3. The hybrid bus apparatus of claim 1 wherein the control circuit is further configured to bridge a communication between the at least one master and at least one of the one or more auxiliary slaves not masked by the at least one slave mask.

4. The hybrid bus apparatus of claim 1 further comprising one or more second auxiliary slaves corresponding to one or more second USIDs, respectively, wherein the hybrid bus bridge circuit further comprises at least one second auxiliary port coupled to the one or more second auxiliary slaves via at least one second auxiliary bus that is identical to the at least one auxiliary bus.

5. The hybrid bus apparatus of claim 4 wherein the register circuit further comprises at least one second slave mask corresponding to the at least one master and the at least one second auxiliary bus, and the at least one second slave mask is configured to mask at least one selected second auxiliary slave among the one or more second auxiliary slaves corresponding to at least one selected second USID among the one or more second USIDs.

6. The hybrid bus apparatus of claim 5 wherein the control circuit is further configured to:
   block a communication between the at least one master and the at least one selected second auxiliary slave based on the at least one second slave mask; and
   bridge a communication between the at least one master and at least one of the one or more second auxiliary slaves not masked by the at least one second slave mask.

7. The hybrid bus apparatus of claim 6 wherein the at least one selected USID is identical to the at least one selected second USID.

8. The hybrid bus apparatus of claim 7 wherein the control circuit is further configured to:
   block the communication between the at least one master and the at least one selected auxiliary slave and bridge the communication between the at least one master and the at least one selected second auxiliary slave in response to the at least one selected auxiliary slave being masked by the at least one slave mask and the at least one selected second auxiliary slave not being masked by the at least one second slave mask; and
   bridge the communication between the at least one master and the at least one selected auxiliary slave and block the communication between the at least one master and the at least one selected second auxiliary slave in response to the at least one selected auxiliary slave not being masked by the at least one slave mask and the at least one selected second auxiliary slave being masked by the at least one second slave mask.

9. The hybrid bus apparatus of claim 6 wherein the at least one selected USID is different from the at least one selected second USID.

10. The hybrid bus apparatus of claim 9 wherein the at least one master is configured to reuse the at least one selected second USID to communicate with at least a second one of the one or more primary slaves on the at least one primary bus.

11. The hybrid bus apparatus of claim 6 further comprising at least one second master, wherein:
    the hybrid bus bridge circuit further comprises at least one second primary port coupled to the at least one second master via at least one second primary bus;
    the register circuit further comprises:
       at least one third slave mask corresponding to the at least one second master and the at least one auxiliary bus and configured to mask at least one second selected auxiliary slave among the one or more auxiliary slaves; and
       at least one fourth slave mask corresponding to the at least one second master and the at least one second auxiliary bus and configured to mask at least one second selected second auxiliary slave among the one or more second auxiliary slaves; and the control circuit is further configured to:
- block a communication between the at least one second master and the at least one second selected auxiliary slave based on the at least one third slave mask; and
- block a communication between the at least one second master and the at least one second selected second auxiliary slave based on the at least one fourth slave mask.

12. The hybrid bus apparatus of claim 5 wherein:
the at least one slave mask comprises at least one bitmap configured to mask the at least one selected auxiliary slave; and
the at least one second slave mask comprises at least one second bitmap configured to mask the at least one selected second auxiliary slave.

13. The hybrid bus apparatus of claim 5 wherein:
the at least one slave mask comprises at least one USID entry configured to identify the at least one selected auxiliary slave; and
the at least one second slave mask comprises at least one second USID entry configured to identify the at least one selected second auxiliary slave.

14. A hybrid bus bridge circuit comprising:
at least one primary port coupled to at least one master via at least one primary bus that is coupled to one or more primary slaves;
at least one auxiliary port coupled to one or more auxiliary slaves via at least one auxiliary bus consisting of a single wire;
a register circuit comprising at least one slave mask corresponding to the at least one master and the at least one auxiliary bus, the at least one slave mask configured to mask at least one selected auxiliary slave among the one or more auxiliary slaves corresponding to at least one selected unique slave identification (USID) among one or more USIDs; and
a control circuit configured to block a communication between the at least one master and the at least one selected auxiliary slave based on the at least one slave mask such that the at least one master can reuse the at least one selected USID corresponding to the at least one selected auxiliary slave masked by the at least one slave mask to communicate with at least one of the one or more primary slaves.

15. The hybrid bus bridge circuit of claim 14 wherein the control circuit is further configured to bridge a communication between the at least one master and at least one of the one or more auxiliary slaves not masked by the at least one slave mask.

16. The hybrid bus bridge circuit of claim 14 further comprising at least one second auxiliary port coupled to one or more second auxiliary slaves corresponding to one or more second USIDs, respectively, via at least one second auxiliary bus that is identical to the at least one auxiliary bus.

17. The hybrid bus bridge circuit of claim 16 wherein the register circuit further comprises at least one second slave mask corresponding to the at least one master and the at least one second auxiliary bus and configured to mask at least one selected second auxiliary slave among the one or more second auxiliary slaves corresponding to at least one selected second USID among the one or more second USIDs.

18. The hybrid bus bridge circuit of claim 17 wherein the control circuit is further configured to:
- block a communication between the at least one master and the at least one selected second auxiliary slave based on the at least one second slave mask; and
- bridge a communication between the at least one master and at least one of the one or more second auxiliary slaves not masked by the at least one second slave mask.

19. The hybrid bus bridge circuit of claim 17 wherein:
the at least one slave mask comprises at least one bitmap configured to mask the at least one selected auxiliary slave; and
the at least one second slave mask comprises at least one second bitmap configured to mask the at least one selected second auxiliary slave.

20. The hybrid bus bridge circuit of claim 17 wherein:
the at least one slave mask comprises at least one USID entry configured to identify the at least one selected auxiliary slave; and
the at least one second slave mask comprises at least one second USID entry configured to identify the at least one selected second auxiliary slave.

* * * * *